United States Patent [19]

Leiter et al.

[11] 4,315,427

[45] Feb. 16, 1982

[54] APPARATUS, METHOD AND SYSTEM FOR DETERMINING THE INTEGRITY OF SEALED CONTAINERS

[75] Inventors: L. David Leiter, Willow Grove; Jacob Ravn, Phoenixville, both of Pa.

[73] Assignee: The West Company, Phoenixville, Pa.

[21] Appl. No.: 148,694

[22] Filed: May 12, 1980

[51] Int. Cl.³ .......................................... G01M 3/02
[52] U.S. Cl. ...................................... 73/52; 73/49.3; 209/529
[58] Field of Search ................. 73/52, 49.3, 45.4, 37; 33/172 R, 169 B, 169 R; 209/529, 531, 597, 599, 601

[56] References Cited

U.S. PATENT DOCUMENTS

| | | | |
|---|---|---|---|
| 2,512,134 | 6/1950 | Baule | 73/52 X |
| 3,371,781 | 3/1968 | Armbruster et al. | 73/52 X |
| 3,416,360 | 12/1968 | Ochs | 73/52 |
| 3,586,165 | 6/1971 | Keinanen | 73/52 X |
| 3,633,742 | 1/1972 | Melton | 73/37 X |

FOREIGN PATENT DOCUMENTS

| | | | |
|---|---|---|---|
| 474565 | 3/1975 | Australia | 73/52 |
| 788501 | 1/1958 | United Kingdom | 33/172 R |

Primary Examiner—Kyle L. Howell
Assistant Examiner—Joseph W. Roskos

Attorney, Agent, or Firm—Eugene E. Renz, Jr.

[57] ABSTRACT

A method, apparatus and system for determining the integrity of a container sealed by means of a closure comprising a resilient sealing element and a cup-like cap having a top and a depending skirt compressing the resilient sealing element over the discharge opening in the container. The invention consists of verifying seal integrity by applying an external force to the cap and measuring the force required to effect initial movement thereof to overcome the residual static force in the resilient sealing element and by comparing the measured force which is essentially equal to the residual static force in the resilient sealing element to a predetermined standard known to provide an acceptable seal. It is known that when the force between the crimped edge of the cap and the container is zero which occurs upon initial displacement of the cap relative to the container, the externally applied force is essentially equal to the residual static force in the resilient sealing element. The residual static force in the resilient sealing element is measured by apparatus including a mechanical force applicator unit having an anvil engageable with the cap mounted on an actuator member of a gauge for measuring the applied force and a microscope, for observing initial downward displacement of the cap when a given external force essentially equal to the residual static force in the resilient sealing element is applied.

6 Claims, 11 Drawing Figures

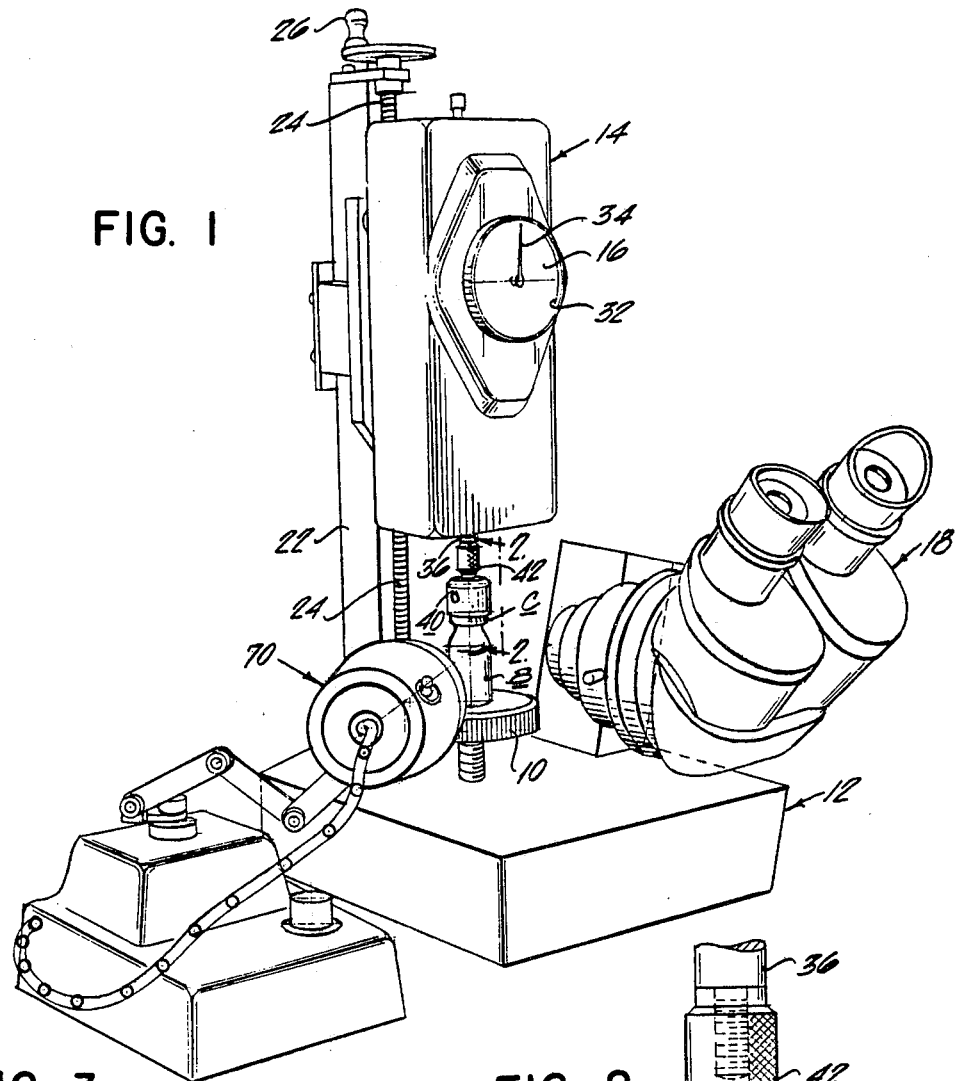
FIG. 1
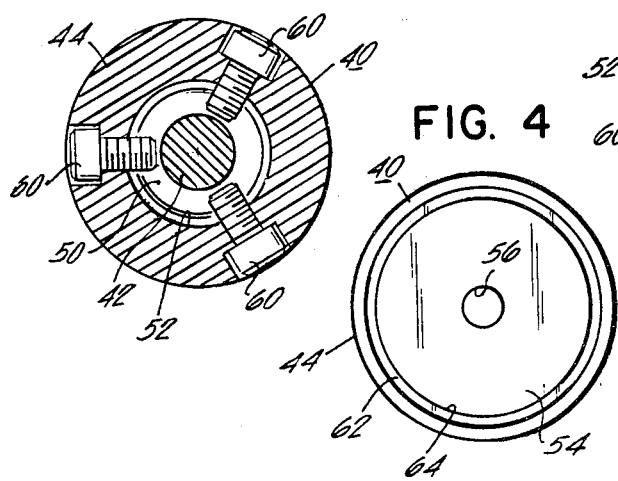
FIG. 3
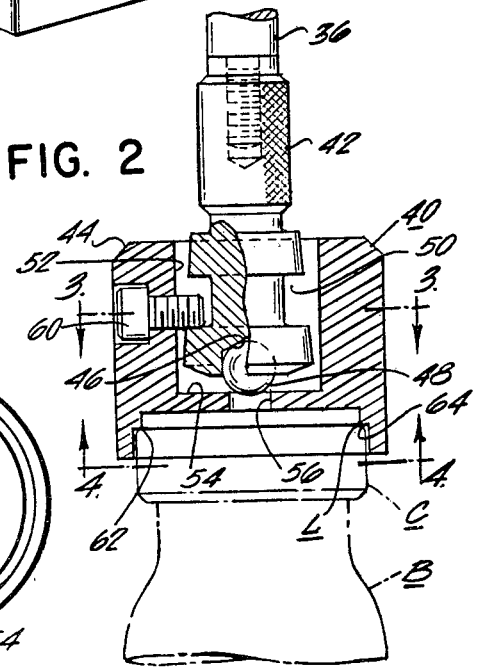
FIG. 2
FIG. 4

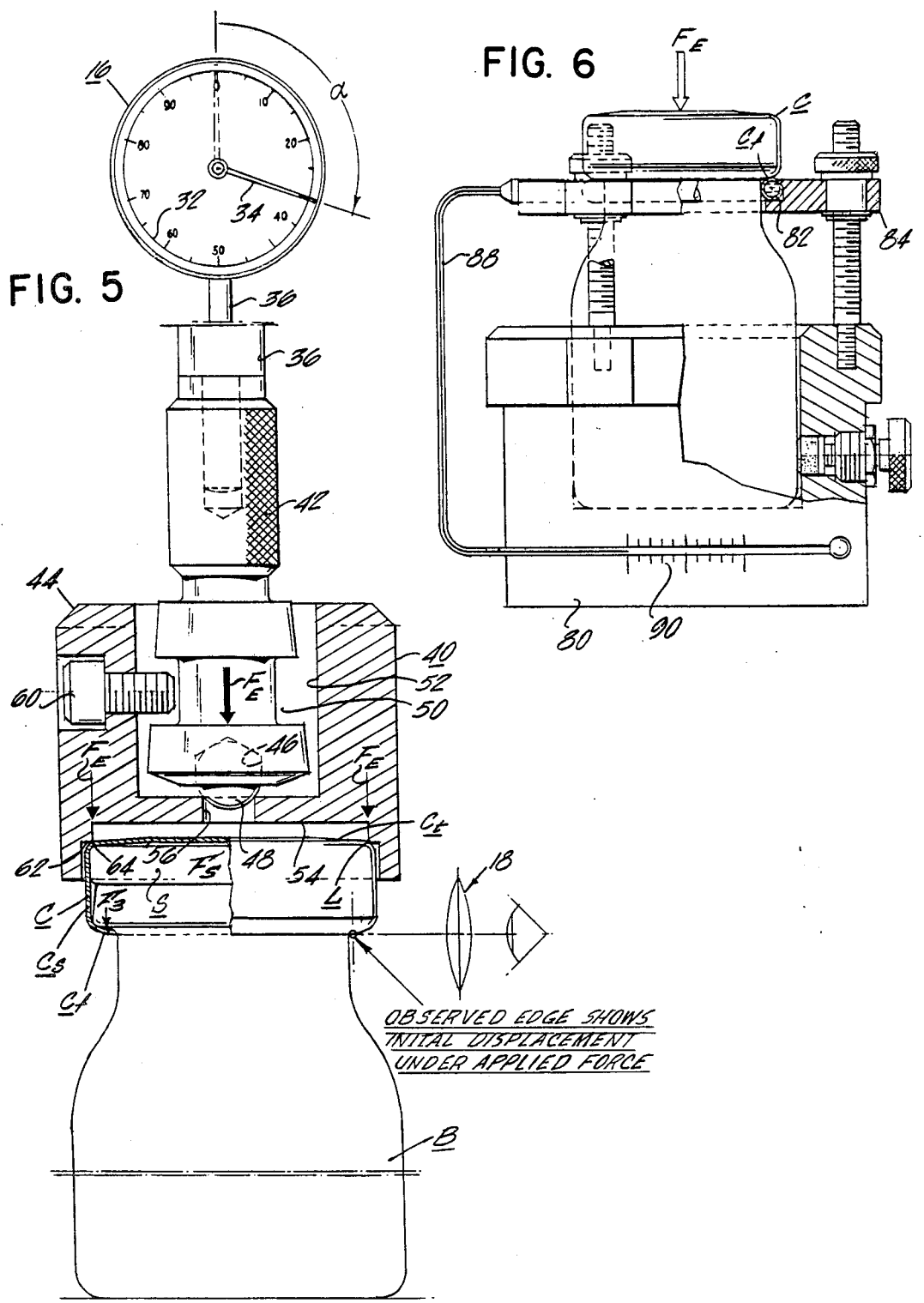

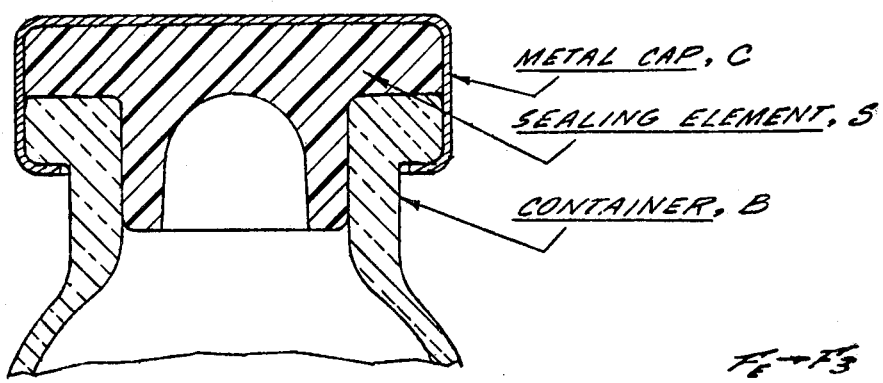
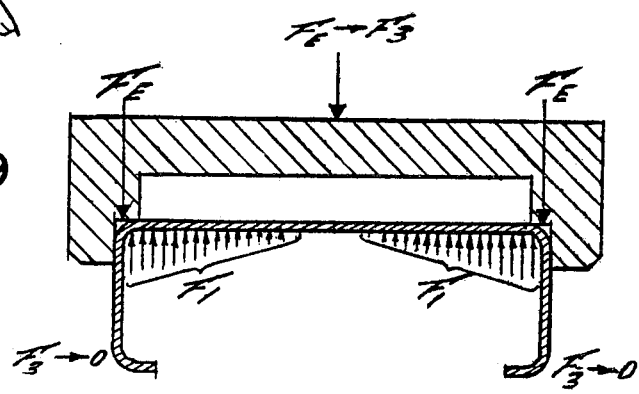
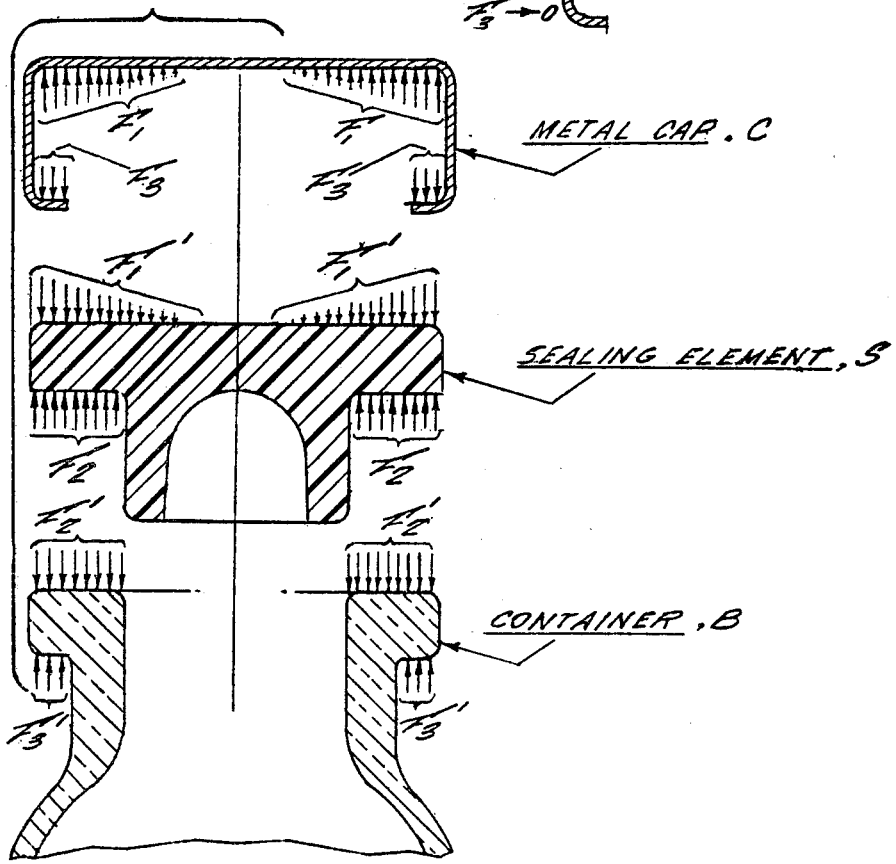

APPARATUS, METHOD AND SYSTEM FOR DETERMINING THE INTEGRITY OF SEALED CONTAINERS

BACKGROUND OF THE INVENTION

The present invention relates to apparatus and system for determining the integrity of sealed containers. The invention has particular application to parenteral pharmaceutical products which are typically packaged in rigid glass containers sealed with a combination rubber and metal closure.

Such pharmaceutical products are usually packaged by high speed automatic filling and capping equipment. The containers or bottles are filled with the medicament at a filling station and thereafter the closure assembly consisting generally of a resilient sealing element made of rubber and a cup-like cap made of aluminum is placed over the discharge end of the container. The capping apparatus then acts to apply a predetermined force to the cap to seat the closure assembly and to crimp the lower edge of the skirt of the cap under or around the bottle finish or flange to seal the container. More specifically during the capping operation the resilient sealing element is compressed between the end face of the container and the cap and held in a compressed state by crimping the cap to the container. The integrity and adequacy of the seal is, therefore, primarily a function of the percent compression of the sealing element or expressed another way, the magnitude of the seating force of the seal against the container around the periphery of the opening in the container. Proper sealing for medicaments is important to prevent exposure to air or loss by evaporation and also to protect the contents from microbiological or other contamination.

It has been found that some containers packaged by mass production techniques are not adequately sealed. The seal is controlled primarily by the capping equipment. For example, for a given cap, resilient sealing element and container assembly, the bottle-raising means of the capping equipment is initially set to apply a predetermined force to effect a given compression of the resilient sealing element to produce the proper seal. If the initial setting of the capping machine is incorrect, the seal produced is inadequate. For example, if the pre-load force in the bottle-raising means is too low, the resilient sealing element is not compressed sufficiently to seal and if too high there is the danger of metal seal distortion, dimpling of the top surface of the resilient sealing element or glass breakage. Even if the initial setting of the capping equipment is correct, the setting may require adjustment by the operator from time to time and if these changes are inadvertently overlooked, inadequate sealing may result.

Presently there are various systems for checking the seal integrity. A common system is one wherein the seal integrity is first checked visually and then usually checked further by selecting containers periodically from the assembly line and inspecting them manually by turning the cap relative to the container. If the cap does not rotate under the manual force applied, the seal was considered adequate. Such a method is clearly inherently imprecise and subjective since it depends on the strength and judgment of the tester, which may vary from person to person and day to day.

In accordance with another system for checking seal integrity which is the subject of a pending application, Rohde, Ser. No. 090,527, APPARATUS, METHOD AND SYSTEM FOR DETERMINING THE INTEGRITY OF SEALED CONTAINERS, filed Nov. 2, 1979, owned by the assignee of the present invention and incorporated herein by reference, means is provided for measuring the pre-seal and post-seal height of the container-closure assembly to determine thickness dimension change of the resilient sealing element and in turn the percent compression of the resilient sealing element (percent R.E.C.) can then be calculated. For any given combination of container, closure and other known elements, a range of percent R.E.C. can be determined which provides seals of adequate integrity as determined by other standard tests. The apparatus for determining the axial compression of the resilient sealing element and thus percent R.E.C. includes a test stand with a planar base on which the container rests, a vertical adjustment column and an indicator gauge actuated by a sensing head for detecting the pre-seal and post-seal height of the container-closure assembly. The gauge may have either a graduated dial scale for comparing pre-seal and post-seal readings or an indicated area of acceptable predetermined compression value relative to an indicated pre-seal "zero" position indicating a seal of adequate integrity. While this system is generally effective for the purposes intended, the system depends on both pre-seal and post-seal readings. Additionally, there is an inherent relaxation of the residual static force in the compressed rubber element with time due to cold flow which the displacement measuring system cannot detect.

SUMMARY OF THE INVENTION

The compression of the resilient sealing element resulting from the capping operation is the main factor determining seal integrity. However, as noted above, there are a number of variables in the operation whereby the actual compression of the rubber sealing element may vary from one sealed container-closure assembly to the next. For better understanding of the present invention, consider briefly the capping process. The capping apparatus applies an external compressive force to the closure which compresses the resilient sealing element and when the outer metal cap is crimped under the finish on the container, the cap serves as a clamp to maintain the resilient sealing element in a compressed state and thereby provide a seal between the resilient sealing element and the container adjacent the opening. The compression loads the resilient sealing element in much the same manner as a mechanical compression spring is loaded when it is compressed. As a result substantially all of the external force applied to the closure in the capping apparatus remains resident in the resilient sealing element after capping is completed. It is this residual static force in the resilient sealing element combined with the compliance of the resilient sealing element to the glass surface of the container which produces the sealing characteristic of the closure. The present invention provides method, apparatus and system for measuring the residual static force in the resilient sealing element of a sealed container-closure assembly. This force can then be compared to a predetermined minimum force determined empirically for a given container-closure assembly for acceptable sealing and if it exceeds the minimum the seal is adequate and if it is below the minimum, then it is inadequate. In the present instance, this is accomplished by applying a gradually increasing external force to the metal cap of the sealed container-closure assembly which at some point will equal and then exceed the residual static force in the resilient sealing element. The external force is applied to a localized area of the cap along a circumferential line adjacent the juncture of the top and skirt in the zone of maximum compression of the resilient sealing element. When this force threshold is crossed, the metal outer cap will begin to move downward as the resilient sealing element is further compressed slightly by the additional load from the applied force. The system includes means for detecting the initial downward movement of the metal cap and observing the value of the force applied at that instant which essentially equals the residual static force in the resilient sealing element. If the residual static force exceeds a predetermined minimum force to provide an adequate seal as determined empirically for a given container-closure assembly, the seal is satisfactory and if below the acceptable minimum, then of course, the seal is of inadequate integrity and the container-closure assembly is rejected.

Accordingly, it is an object of the present invention to provide a new and useful apparatus and system for checking the seal integrity of a sealed container employing a resilient sealing element wherein the residual static force in the resilient sealing element after sealing may be checked relatively accurately and easily.

Another object is to provide such an apparatus and system which is simple, inexpensive and accurate.

A still further object of the present invention is to provide a novel apparatus and system capable of checking seal integrity for different types of closures utilizing a resilient sealing element.

Still another object of the present invention is to provide apparatus and system for checking seal integrity which may be used by operators with minimal skills and still provide accurate results.

DESCRIPTION OF THE DRAWINGS

The above and other objects of the present invention and the various features and details of the operation and construction thereof are hereinafter more fully set forth with reference to the accompanying drawings, wherein:

FIG. 1 is a perspective view of a seal testing apparatus in accordance with the present invention;

FIG. 2 is an enlarged sectional view of the universally mounted cap anvil of the apparatus taken on lines 2—2 of FIG. 1;

FIGS. 3 and 4 are sectional views taken on lines 3—3 and 4—4 of FIG. 2 respectively;

FIG. 5 is a side elevational view partly in section showing the cap anvil engaging a container closure;

FIG. 6 is a schematic view of still another embodiment;

FIG. 7 is an enlarged schematic section of a container-closure assembly;

FIG. 8 is an exploded free body diagram of the cap, resilient sealing element and container showing the reaction forces on the various elements in a sealed condition of the container-closure assembly;

FIG. 9 is a free body diagram of the cap and the force applied by the mechanical force applicator unit;

DESCRIPTION OF THE PREFERRED EMBODIMENTS

Figure 11:
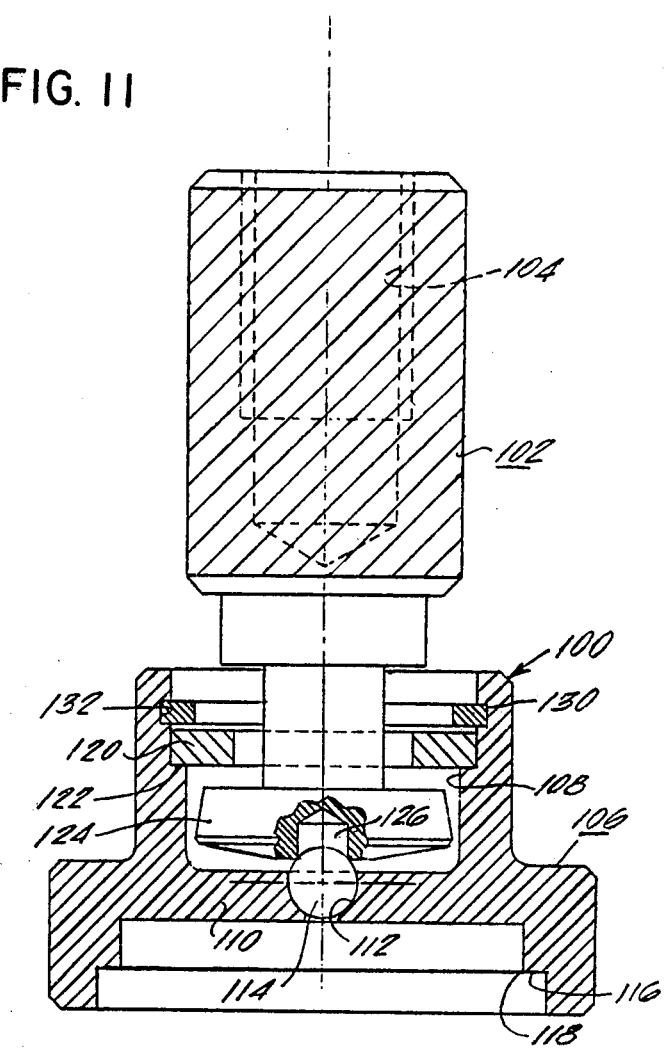
FIG. 11 is an enlarged transverse sectional view of an alternate cap anvil in accordance with the present invention.

The apparatus and system of the present invention are illustrated and described herein with reference to a typical package for medicaments such as serums. The package includes a bottle B, a resilient sealing element S such as rubber engaging over the discharge opening in the bottle and a metal cap C having a top $C_t$ and a peripheral skirt $C_s$ made of a thin gauge aluminum so that the lower edge of the skirt can be crimped or rolled to form a return flange $C_f$ engaging under the bottle finish to maintain the sealing element S in a compressed state. The invention, of course, has application to other types of assemblies incorporating resilient sealing elements.

Considering now broadly the apparatus and system of the present invention in terms of function and with particular reference to FIGS. 1 and 5, a sealed container-closure assembly to be examined for seal integrity is placed on the base 10 of a test stand 12 and then an external compressive force is applied to the cap C through a manually operated mechanical force applicator unit 14 including a force gauge 16 for measuring applied force. As the external force $F_e$ is being applied, the crimped flange $C_f$ of the cap is observed by means of indicia means, in the present instance, a microscope 18 to determine initial downward displacement of the cap relative to the neck of the glass bottle just behind it in the microscope's view field. At the point of initial displacement of the cap C, the operator terminates application of the externally applied force $F_e$ via the mechanical force gauge and notes the force on the dial of the force gauge. The force shown on the indicator dial is substantially equal to the residual static force $F_s$ of the resilient sealing element. The residual static force $F_s$ in the resilient sealing element and the force $F_3$ between the crimped return flange $C_f$ of the cap and container are equal in the sealed container for equilibrium. When the externally applied force $F_e$ displaces the outer cap C downwardly to disengage the crimped flange $C_f$ from the container finish, the force $F_3$ between the crimped flange $C_f$ and the container finish decreases to zero and therefore, the externally applied force $F_e$ is equal to the residual static force $F_s$ in the resilient sealing element.

As noted above the residual static force $F_s$ in the resilient sealing element is then compared to a predetermined force developed emperically for adequate seal tightness to accept or reject the sealed container-closure assembly under test. The system, therefore, provides simple and easy means for validation of the sealing operation.

The relationship between the static residual force $F_s$ of the resilient sealing element and the externally applied force $F_e$ can be understood best with reference to an analysis of the elements of the sealed container-closure assembly in the free body state illustrated in FIG. 8. As illustrated therein, in the sealed condition of the container-closure assembly, the resilient sealing element is under compression producing reaction forces on the resilient sealing element, the cap and the container which are in equilibrium.

For ease of understanding, the elements of the sealed container are shown in an exploded view with the forces associated with each element designated by the letter F and appropriate distinguishing subscripts and primes. Considering first the cap C, the force $F_1$, which is the reaction to force $F_1'$ of the resilient sealing element S is balanced by force $F_3$ which is the reaction to force $F_3'$ of the container finish. Force $F_1'$ is balanced by force $F_2$ designated as the residual static force $F_s$ of the resilient sealing element S and $F_2'$ is balanced by $F_3'$. Now, as shown in FIG. 9, when the force applicator 14 applies a gradually increasing downward external force $F_e$ on the cap C of the sealed container-closure assembly, this downward force acts to replace the force $F_3$ on the return flange $C_f$ and as the external force $F_e$ increases, the magnitude of $F_3$ decreases. When external force $F_e$ completely replaces force $F_3$, (i.e. $F_3=0$) any further increase of $F_e$ will compress the resilient sealing element S further and in turn will produce a small downward motion of the return flange $C_f$ of the cap C relative to the container finish. It is this initial displacement of the return flange of the cap that is observed by the operator through the microscope.

Referring to FIG. 9 when $F_e$ replaces $F_3$, then $F_e$ equals $F_1$ and since $F_1$ is the reaction to the residual static force $F_1'$, $F_1$ and $F_1'$ have to be equal. Finally, since $F_1'$ is equal to $F_s$ by definition, $F_e$ is equal to $F_s$.

Considering now the more specific details of the seal force testing apparatus in accordance with the present invention, the test stand 12 includes an upstanding vertical support column 22 on which the mechanical force applicator unit 14 is mounted. The force applicator unit 14 is adapted for vertical adjusting movement. In the present instance, the means for actuating the force applicator unit 14 comprises a threaded shaft 24 rotatable manually by a crank 26, the force applicator unit 14 having a conventional slide mechanism to mesh with the threaded shaft 24 for displacement in a vertical direction upon rotation of the hand crank. The force applicator unit 14 is of generally conventional design including a graduated dial face 32, a rotatably mounted indicator needle 34 which sweeps the face of the dial and an actuator arm or rod 36 projecting from the lower terminal end of the force guage 14 which is displaceable and connected by internal mechanism to the indicator needle 34.

A universally mounted cap anvil assembly 40 comprising a stem 42 and an avil head 44 is mounted at the lower end of the actuator arm 36 of the force applicator unit 14. In the present instance, the stem 42 of the cap anvil assembly is threaded to the lower terminal end of the actuator arm so that cap anvil assemblies 40 are readily interchangeable to suit different closure sizes. The lower end of the stem 42 is a universal fitting which has a pocket 46 at its lower terminal end for mounting a ball 48. The body of the fitting has a central annular groove 50 to serve as a loose mounting means for the anvil head 44. The anvil head 44, as illustrated, is of generally cylindrical shape and has a central bore 52 for receiving the universal fitting. The bore 52 terminates in an end wall 54 having a circular opening or socket 56 of a diameter smaller than the ball 48 providing a seat therefor. Retaining means comprising in the present instance, three screws 60 engage through the sidewall of the anvil head so that the terminal ends engage in the annular groove 50 of the universal fitting in a manner permitting a limited angular displacement of the anvil head 44 relative to the universal fitting. This action is necessary to provide circumferentially uniform force application by the anvil to the top of the cap C to be tested. Spaced downwardly from the end wall 54 of the anvil head 44 is a feeler wall 62 of stepped configuration defining a shoulder 64 which engages the top of the cap along a circular line L approximately at the vertical center line of its corner radius in the manner illustrated in FIG. 5. The arrangement of the stem and anvil head specifically the ball 48 and socket 56 provides for transmission of the applied force in a uniform manner to the cap C along the circumferential line L to prevent cocking displacement of the cap. This uniform force distribution on the cap is important to ensure accurate readings. The localized line of contact L in a relatively rigid area of the cap C and in the essentially coincident zone of maximum compression of the resilient sealing element S is also important for accurate readings.

The apparatus further includes a light source 70 to illuminate the cap area to facilitate better observation through the microscope of the metal cap movement during the test procedure.

Figure 10:
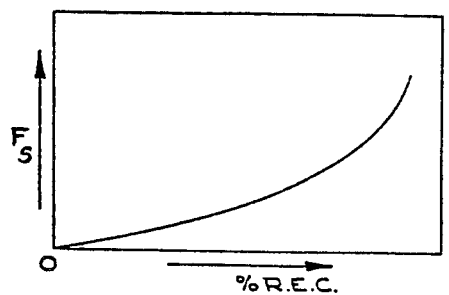
FIG. 10 is a trend line curve showing the relationship between the residual static force in the resilient sealing element and percent R.E.C.

As pointed out in detail in companion application Ser. No. 090,527, the resilient sealing element S under mechanical loading, such as during the capping operation, behaves in the nature of an incompressible fluid altering its shape elastically at constant volume and when there is a predetermined percent axial compression of the resilient sealing element S, an effective seal is provided. The percent compression is related to displacement of the sealing element S which takes place under mechanical loading. Tests set forth in detail in application Ser. No. 090,527 to determine percent R.E.C. to achieve an acceptable seal show that a given displacement differential of the sealing element S to yield a predetermined percent R.E.C., such as twenty-five percent (25%) compression, is sufficient to indicate that a seal of the required integrity exists. The tests also show that once the percent R.E.C. for a given container-closure exceeds a threshold value, for example in the range of fifteen and twenty percent (15 and 20%), further increases in R.E.C. have relatively little effect in enhancing the sealing characteristics. Thus, it would appear that compression values as high as about thirty-five percent (35%) are not necessary since at these levels, metal cap distortion, dimpling of the top surface of the resilient sealing element, and glass breakage most frequently occur. Percent R.E.C. and the static residual force $F_s$ of the resilient sealing element in a sealed closure are related not by a typical linear relationship, for example, as in a mechanical compression spring but by a trend line of the type shown in FIG. 10. Based on the displacement tests and comparisons, the range for the residual static force to provide an adequate seal lies between five (5) to fifty (50) pounds for a typical range of closure sizes. Of course, a more precise range may be easily developed empirically for a given type of container-closure assembly or for a specific range of sizes.

Considering now a complete cycle of operation, closures may be assembled to containers automatically in capping equipment available commercially from The West Company under the trademark WESTCAPPER wherein a capping head mounted for reciprocal movement effects a given displacement of the closure to seat the cap and compress the resilient sealing element S and then crimps the lower edge of the skirt under the finish or flange on the container. It has been found that the seal integrity varies for container-closure assemblies processed on either manual or automatic capping equipment. More specifically, it has been observed that the compression of the resilient sealing element or the residual static force in the resilient sealing element varies and that these variations are due to the capping equipment per se and/or variables in the elements of the container-closure assembly. Thus the need for a post-capping check of seal integrity. In accordance with the present invention this is achieved by selecting the proper cap anvil for the container-closure assembly to be tested and assembling it to the actuator arm 36 of the force applicator unit 14. The operator then places the sealed container on the base 10 of the test stand 12 in the manner shown in FIGS. 1 and 5 and adjusts the container and anvil vertically so that the microscope is trained and focuses in the area of the lower edge of the return flange $C_f$ of the cap C as shown schematically in FIG. 5. The operator then rotates the crank 26 to advance the force applicator unit 14 downwardly to apply an external force $F_e$ against the cap while continuously observing the area of the lower edge of the cap through the microscope 18. At some point during the application of the externally applied force $F_e$, specifically where the externally applied force $F_e$ exceeds the force $F_3$ between the cap C and the container, the cap C is displaced downwardly relative to the neck of the glass bottle just behind it in the microscope's view field and at that instant the operator discontinues rotation of the hand crank 26 and observes the force recorded on the force gauge's dial 32. As noted above, this force is essentially equal to the residual static force $F_s$ in the resilient sealing element and is the basis for comparison to an empirically developed minimum or range to accept or reject a given container-closure assembly.

There is illustrated in FIG. 6 another embodiment of seal force test apparatus and system in accordance with the present invention. The principle of operation of this embodiment of the invention is essentially the same as that described above, except that the means for sensing the initial displacement of the metallic cap member C and the mechanism for achieving this is different. Thus the force gauge 14 and the means for actuating the force gauge to apply the external force $F_e$ to the cap through a cap anvil 40 is identical to that described previously. In the present instance, however, the sealed container-closure assembly is supported in a cup-like receptacle 80 and an annular sensing collar 82 of flexible material is supported on an adjustable rig 84 which circumscribes the neck of the container in close contact with the crimped return flange $C_f$ of the cap in the manner shown. The sensing collar 82 is filled with a non-compressible fluid. A capillary tube 88 extends from the collar 82. The terminal end of the capillary tube 88 remote from the collar is normally void and overlies a scale 90 on the base. Now in the operation of this system with the sealed container-closure assembly in the position shown in FIG. 6, when the external force $F_e$ applied to the cap in the same manner described above effects initial downward displacement of the cap C relative to the container, the terminal flange $C_f$ of the cap compresses the flexible hydraulic collar 82 against the rig to displace fluid through the capillary tube 88 which displacement is observed in the lower edge portion of the capillary tube in FIG. 6 as the fluid level is moved beyond the zero point on the scale 90. This, of course, is a signal to the operator to cease application of the external force $F_e$ and to read the gauge to either accept or reject the sealed container-closure assembly. It is significant that the geometric arrangement and proportions of the flexible collar 82 and the capillary tube 88 combine to constitute a very sensitive hydraulic amplifier, and one that is comparable in sensitivity to the microscope-aided eye.

There is shown in FIG. 11 a modified cap anvil for use in a test apparatus in accordance with the present invention. The cap anvil assembly which is generally designated by the numeral 100 is generally similar to the previously described cap anvil except that the means mounting the stem to the head is different and the pivot ball is located closer to the top surface of the cap for greater accuracy. Thus, the modified cap anvil assembly 100 comprises a stem or universal fitting 102 having an internally threaded bore 104 to detachably secure it to the actuator arm 36 of the force applicator unit 14 and a head 106. The head 106 is of generally cylindrical shape and has a central cavity or pocket 108 for receiving the stem 102, the pocket 108 terminating in an end wall 110 having at its center, a spherical pocket 112 for a pivot ball 114. Spaced downwardly from the end wall 110 of the anvil is a feeler wall 116 of stepped configuration defining a shoulder 118 which engages the top of the cap along a circular line L approximately at the vertical center line of its corner radius in the manner previously described and as illustrated, for example, in FIG. 5. This arrangement provides the advantages noted previously and is somewhat more accurate by reason of locating the pivot of the stem and head in a plane closer to the top of the cap.

In the present instance, the retaining means supporting the head 106 on the stem 102 comprises an enlarged washer 120 which seats on a shoulder 122 in the pocket 108 spaced from the enlarged head 124 of the stem 102 which has an opening 126 of circular cross section in its end face of smaller diameter than the ball 114 to pivot on the ball and a truarc spring-type retaining ring 130 which engages in an annular groove 132 and overlaps and confronts the washer 120. Washer 120 is suitably slotted through a portion of its circumference to allow assembly about the small diameter portion of stem 102.

It is noted that the term "sensing" is used in the claims in relation to the displacement of the cap relative to the container when the external force is applied. In the principal embodiment, "sensing" is by visual observation through a microscope whereas in the alternate embodiment the "sensing" is by hydraulic means. It is to be understood, therefore, that the term "sensing", as used herein is in its broadest sense and is not limited to visual observation or hydraulic or equivalent means. It may be done electronically, for example.

Even though the visual sensing means is located to observe displacement of the cap in only one location, the system can be modified within the scope of the invention to sense displacement at, for example, three locations circumferentially spaced about the cap and then average the force readings obtained and in this manner obtain a more precise external force value for checking seal integrity. This system offsets certain variables in the glass finish and resilient sealing element about the periphery of the discharge opening which may produce variables in the seating force of the resilient sealing element against the container end wall at different circumferential locations.

The seal force tester of the present invention can measure the inherent relaxation of the residual static force with time in the compressed rubber element due to cold flow. This relaxation characteristic is related to compression set which is also a cold flow phenomenon. This means that attention must be paid to the time delay between sealing and reading on the seal force tester since the residual static force in the compressed rubber element will decrease on a logarithmic basis with time.

The seal force test apparatus and system of the present invention are designed for use as spot checking devices of production applications or in laboratory use.

It is to be understood, however, that the system may be adapted for in-line operation to permit one hundred percent (100%) inspection in production applications and that only a single test apparatus downstream of the capping equipment is required.

What is claimed is:

1. A method for testing the integrity of the seal of a container sealed by means of a closure comprising a resilient sealing element and a mechanical element compressing said resilient sealing element and locking the same in sealed relationship to said container which comprises:

applying an external force to said mechanical element in a direction to further compress said resilient sealing element, sensing displacement of said mechanical element relative to said container when said externally applied force is substantially equal to the initial residual static force in said compressed resilient sealing element, and comparing the said residual static force so determined to a predetermined standard known to indicate sufficient compression of said resilient sealing element to provide an acceptable seal.

2. Apparatus for testing the integrity of a container B sealed by means of a closure comprising a resilient sealing element S and a cup-like cap (C) having a top and a depending skirt compressing said sealing element over the discharge opening in the container comprising means for applying an external force to the cap in a direction to further compress said resilient sealing element, and indicia means to detect initial displacement of said cap relative to said container when the externally applied force exceeds the residual static force in said sealing element.

3. Apparatus as claimed in claim 2 wherein said indicia means includes a microscope.

4. Apparatus as claimed in claim 2 wherein said indicia means comprises a collar made of a flexible material filled with an incompressible fluid supported in a position adjacent the cap and a capillary tube partially filled with said fluid in communication with said collar whereby displacement of said cap effects compression of said collar and displacement of said fluid in said capillary tube.

5. A system for testing the integrity of a container sealed by means of a closure comprising a resilient sealing element and a cap having means for seating the sealing element over the opening of the container to firmly hold said sealing element with a predetermined residual static force against the container comprising a force guage including means for applying an external force to the cap in a direction to further compress said resilient sealing element, means for detecting the initial displacement of said cap relative to the container when the external force slightly exceeds the residual static force in the sealing element and means for determining the applied force.

6. A method as claimed in claim 1 including sensing displacement of said mechanical element at various locations about the periphery thereof.

* * * * *